United States Patent [19]
Kalmanash

[11] Patent Number: 5,442,522
[45] Date of Patent: * Aug. 15, 1995

[54] WIDE DIMMING RANGE BACKLIGHT FOR LIQUID CRYSTAL DEVICES

[75] Inventor: Michael H. Kalmanash, Los Altos, Calif.

[73] Assignee: Kaiser Aerospace and Electronics Corporation, Foster City, Calif.

[ * ] Notice: The portion of the term of this patent subsequent to May 18, 2010 has been disclaimed.

[21] Appl. No.: 246,175

[22] Filed: May 18, 1994

[51] Int. Cl.⁶ .............................. F21V 9/04; F21V 7/22
[52] U.S. Cl. .......................................... 362/26; 362/31; 362/62
[58] Field of Search ................. 362/26, 31, 23, 62, 362/293, 230, 231; 359/49, 58

[56] References Cited

U.S. PATENT DOCUMENTS

| | | | |
|---|---|---|---|
| 4,277,827 | 7/1981 | Hehr | 362/354 X |
| 4,934,793 | 6/1990 | Klein | 362/62 |
| 5,143,433 | 7/1992 | Farrell | 362/26 X |
| 5,211,463 | 5/1993 | Kalmarash | 362/31 X |

Primary Examiner—Ira S. Lazarus
Assistant Examiner—Thomas M. Sember
Attorney, Agent, or Firm—Marvin H. Kleinberg

[57] ABSTRACT

A backlight system for liquid crystal device display is equipped with a dual lighting system for day viewing and night viewing. The day lighting system uses conventional fluorescent or incandescent lamps for full color display during daytime use. The night lighting system uses a lower intensity light source. The day lighting system is disabled while the night system is in use. The dual lighting system provides an extended dimming range compared to what would otherwise be available.

22 Claims, 4 Drawing Sheets

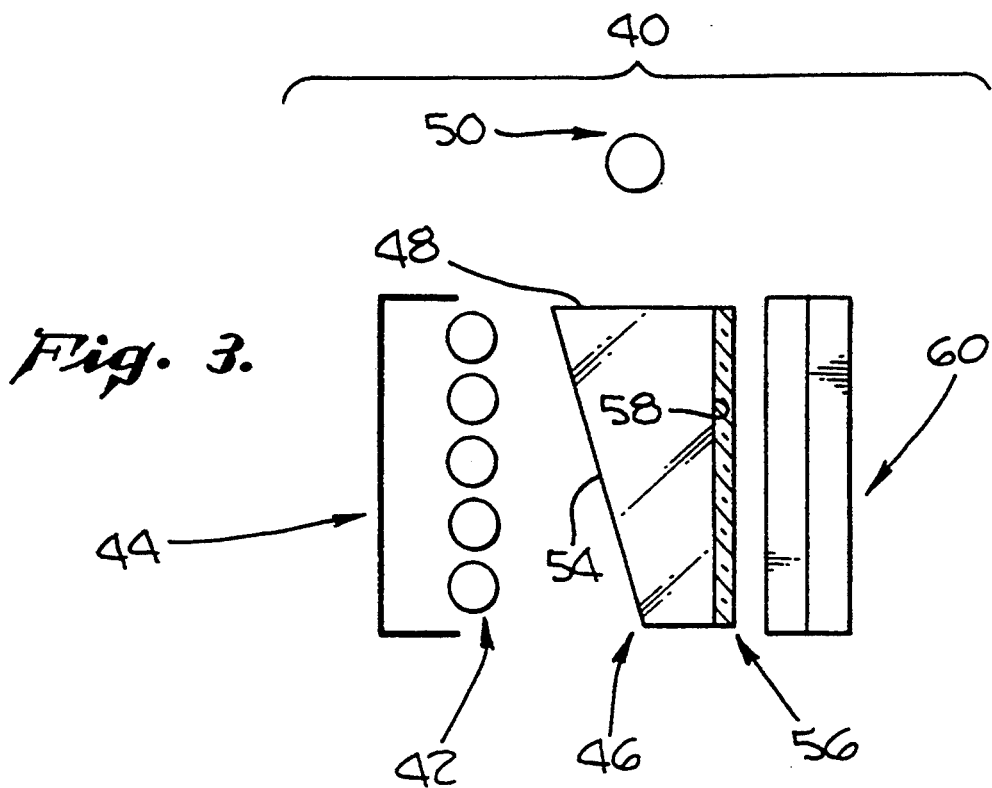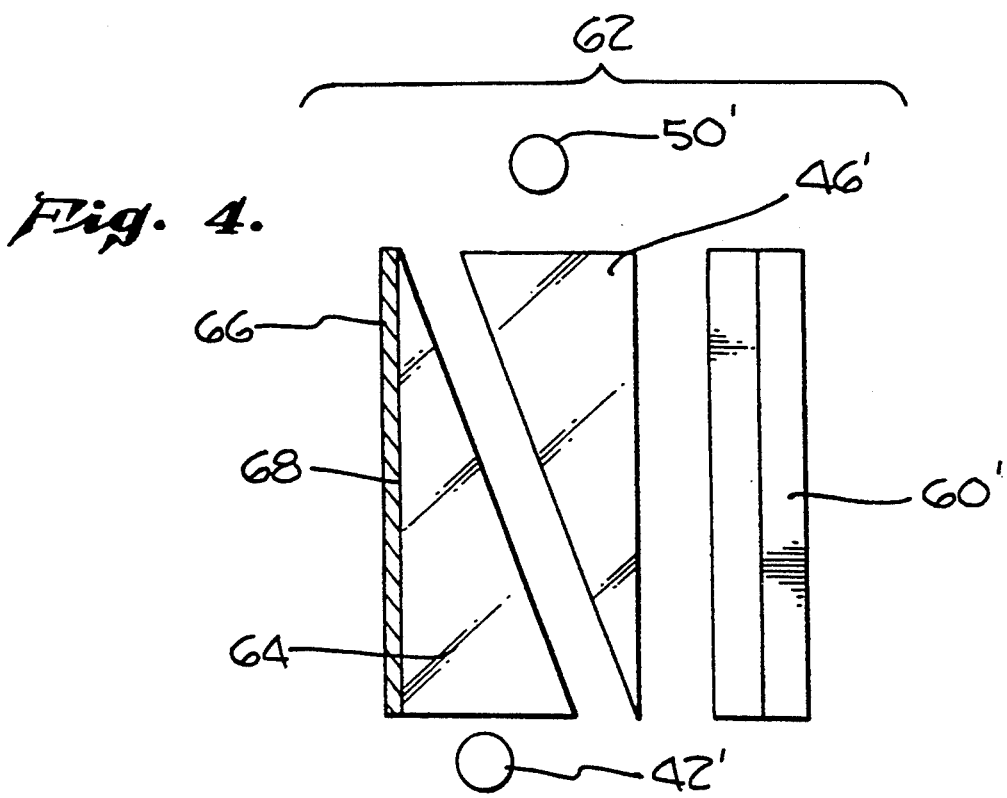

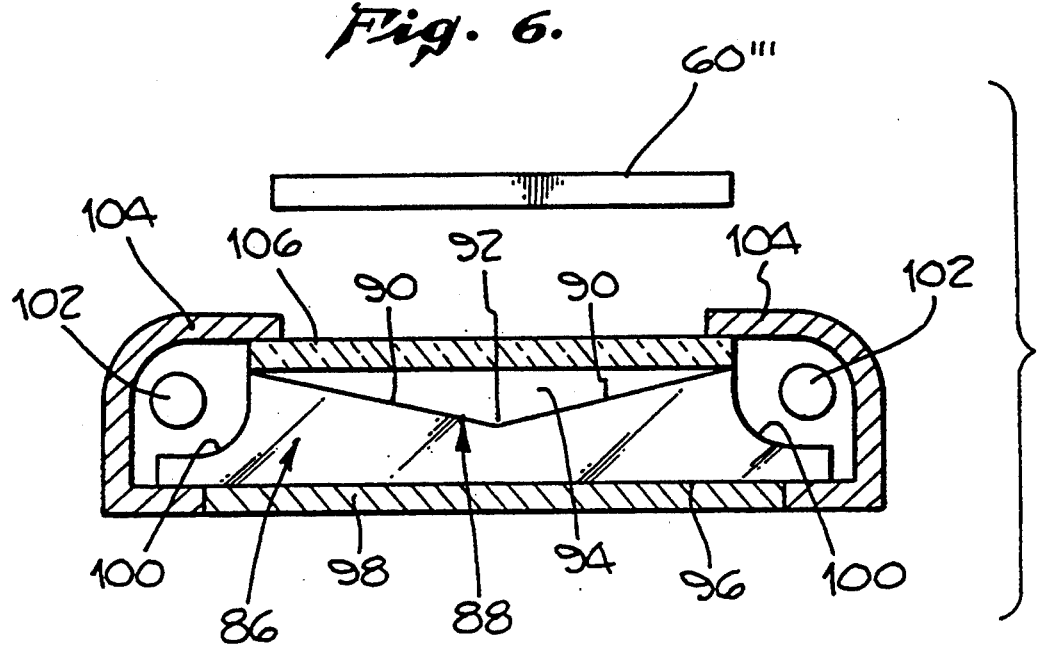
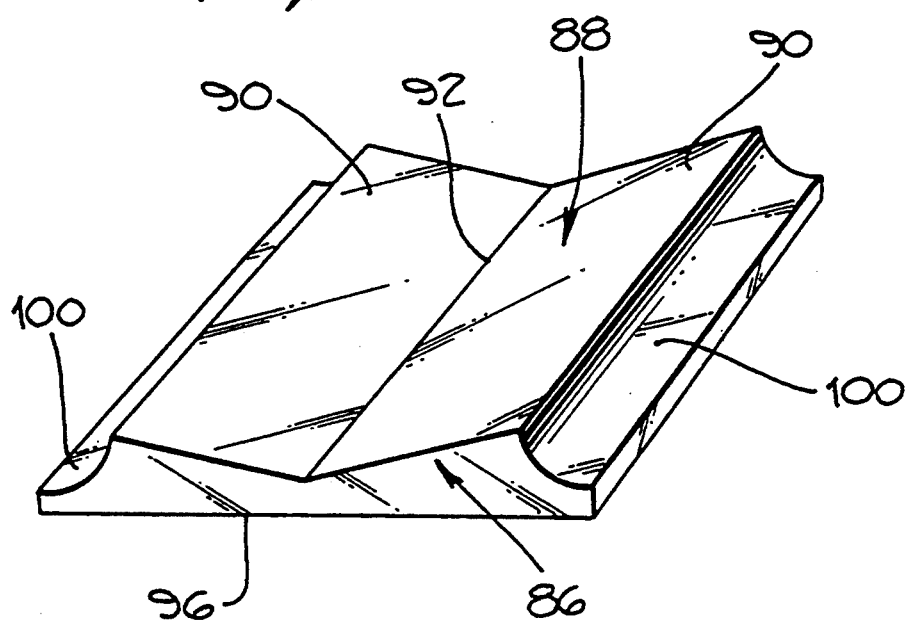

WIDE DIMMING RANGE BACKLIGHT FOR LIQUID CRYSTAL DEVICES

BACKGROUND OF THE INVENTION

The present invention relates to display devices and, more particularly, to an improved backlight system for liquid crystal device ("LCD") displays, designed for use in daytime and with night vision imaging systems.

1. Review of the Prior Art.

LCD's have been employed as modulators of light, and, as such, have been extensively employed in various devices as displays for information in various forms and formats. Reflective LCD's rely upon impinging illumination which enters the face of the device, is reflected from a rear surface, and exits the face. Reflective LCD's have the advantages of lower power requirements, and reductions in size and weight compared to transmissive LCD's, which must have illumination sources.

Typical uses of reflective LCD's are in wrist watch faces and some lap top computer screens. These require ambient light to provide the contrast between the light and dark portions of the display. Reflective LCD's do not work effectively in a dimly lighted environment, and are completely ineffective in darkness. Some watchmakers solve that problem by providing a small light source in the watch to illuminate the face, creating the necessary contrast between light and dark. However, some of the benefit of the reflective device (i.e., lower power and fewer components) is lost thereby.

While suffering in the presence of low ambient illumination, the reflective device is also sensitive to the light transmissive ability of the LCD, since the luminance of the display is dependent upon the square of the transmission of light through the LCD. This is because the ambient light must travel through the LCD to the reflective surface and then back ,out through the LCD again.

Typically, a monochrome twisted nematic LCD, such as are used in watch faces, can have light transmission of up to 35%. This is adequate for reflective mode viewing, where the luminance level of the display will be about 10% of the viewing ambient.

In contrast, Full Color, LCD displays must use artificial illumination devices due to the extremely low rate of light transmission through the display. Creating a color display requires the incorporation of absorptive color dye filter mosaics along with polarizers, diffusers and other absorptive structures. The absorptive dyes and other structures allow light transmissions in the range of less than 5%, and in the reflective mode would have a luminance of approximately 0.25% of the ambient light level, which is unacceptably low.

A typical backlight illumination source is a fluorescent lamp, which has the requisite properties of high efficiency, long life and good color balance (i.e., transmits the full range of frequencies within the visible spectrum in their normal concentrations). Fluorescent lamps are also capable of dimming over a broad dynamic range (typically up to 2,000:1), however a wider range of luminance levels might be needed for displays that are to be viewed in total darkness as well as in high ambient illuminations.

Transmissive color LCD displays have found application in color television projection systems and in "flat screen" color displays for computer systems. Yet another application for such devices is in avionics multifunction displays, which are required to present both full-color graphics and multi-gray scale video imagery. Such a display must have high brightness and contrast for good sunlight viewing, as well as a wide dimming range for night time operation.

Sanai et al., U.S. Pat No. 5,029,045, Horiuchi, U.S. Pat. No. 4,998,804, and Suzawa, U.S. Pat. No. 4,618,216 teach the full-color illumination of LCD's, while Tanaka et al., U.S. Pat. No. 5,040,098, allows illumination of monochromatic LCD displays whose color attribute is adjusted by means of organic fluorescent dyes. The LCD illumination device of Hamada, U.S. Pat. No. 4,914,553 utilizes a Fresnel reflection surface, and can be used with either built-in or external light sources. Masuzawa et al., U.S. Pat. No. 4,642,736, teaches a light diffuser for normal illumination of various types of machinery as well as LCD devices.

In an earlier patent of the present inventor, U.S. Pat. No. 5,211,463, issued May 18, 1993, and assigned to the assignee of the present invention, several back light devices were disclosed that could be used with night vision imaging systems ("NVIS"). Several alternative embodiments were shown in which the night illumination source was either chosen from a class of sources that did not emit infrared and near infrared frequencies, or a filter that removes infrared and near infrared frequencies was interposed between the night light source and the remaining structure.

During the prosecution of the applications, the following references were cited as being relevant, but were not applied: U.S. Pat. Nos. 5,146,354; 5,143,433; 4,998,804; 4,934,793; and 4,277,817. Accordingly, no discussion of these references is included herein.

The primary object of the present invention is to permit the reading of an LCD display at night with minimal luminance (to preserve dark adaptation), as well as in daylight conditions. It appeared that the structures of the prior U.S. Pat. No. 5,211,463 could be adapted to this task by removing the infrared blocking filters.

SUMMARY OF THE INVENTION

In order to achieve a full-color LCD display capable of a broad range of luminance, the present invention utilizes separate lamps for day (high luminance) and night (low luminance) operation. For daytime viewability, high efficiency "day" lamps are used. The display so illuminated is characterized by high luminous efficiency, good color separation, high brightness and high contrast.

For use at night, when lower levels of illumination are required, one or more dedicated full spectrum "night" lamps can be used. Such lamps do not need to illuminate the LCD brightly for night viewing and the emission profile in the visible spectrum need not be adjusted to experience a full color display. A modification of the structures disclosed in U.S. Pat. No. 5,211,364 to the inventor of the present invention, appears to solve the problem. Accordingly, the drawings, specification and claims of the prior patent are used herein, modified as necessary to disclose and claim the present invention.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 3 is an exploded side view of an LCD backlight device according to the present invention, which uses a back light for day viewing and is edgelit for night viewing;

FIG. 4 is an exploded side view of a dual edgelit backlight for day and night viewing of an LCD;

FIG. 6 is a cross-sectional view of a complete dual sided, dual edgelit backlight device employing the panel shown in FIG. 5, for day and night LCD viewing;

FIG. 7 is a perspective view of the panel of FIG. 6; and

DESCRIPTION OF THE PREFERRED EMBODIMENTS

Figure 1:
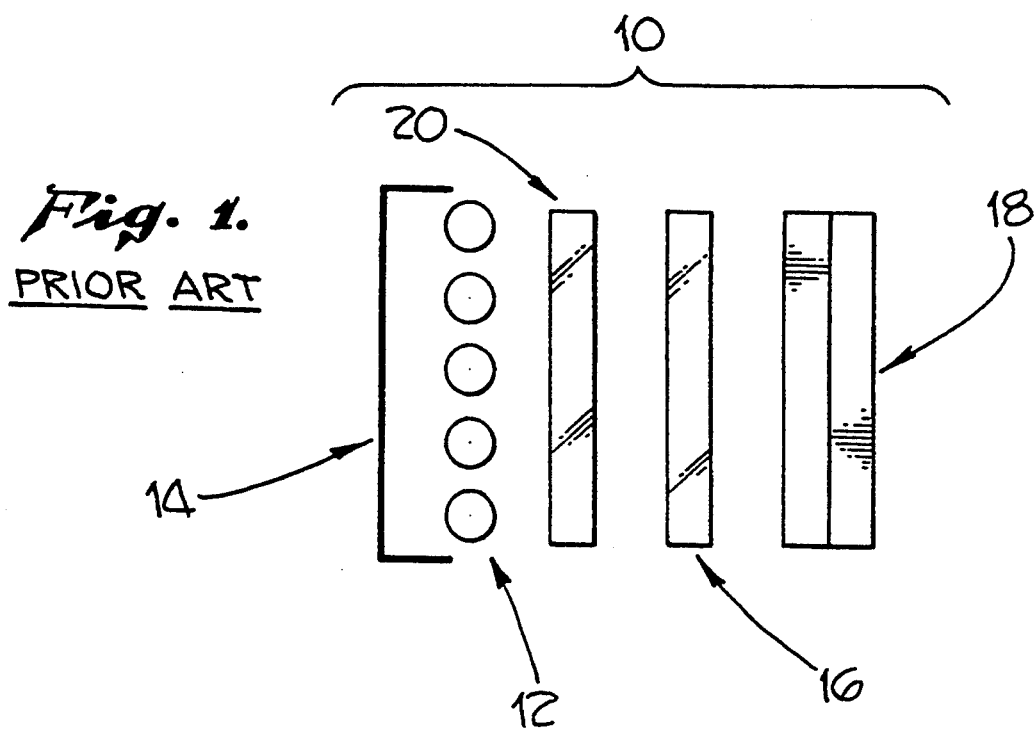
FIG. 1 is an exploded side view of a prior art backlit LCD structure.

FIG. 1 illustrates a conventional LCD backlight structure 10 using a set of high efficiency, high brightness, fluorescent lamps 12 mounted in a reflector housing 14 to enhance the overall luminous efficiency. The structure also incorporates a diffuser plate 16, which scatters the light rays from the individual lamps 12, to create a uniform luminance plane behind an LCD display 18.

Figure 2:
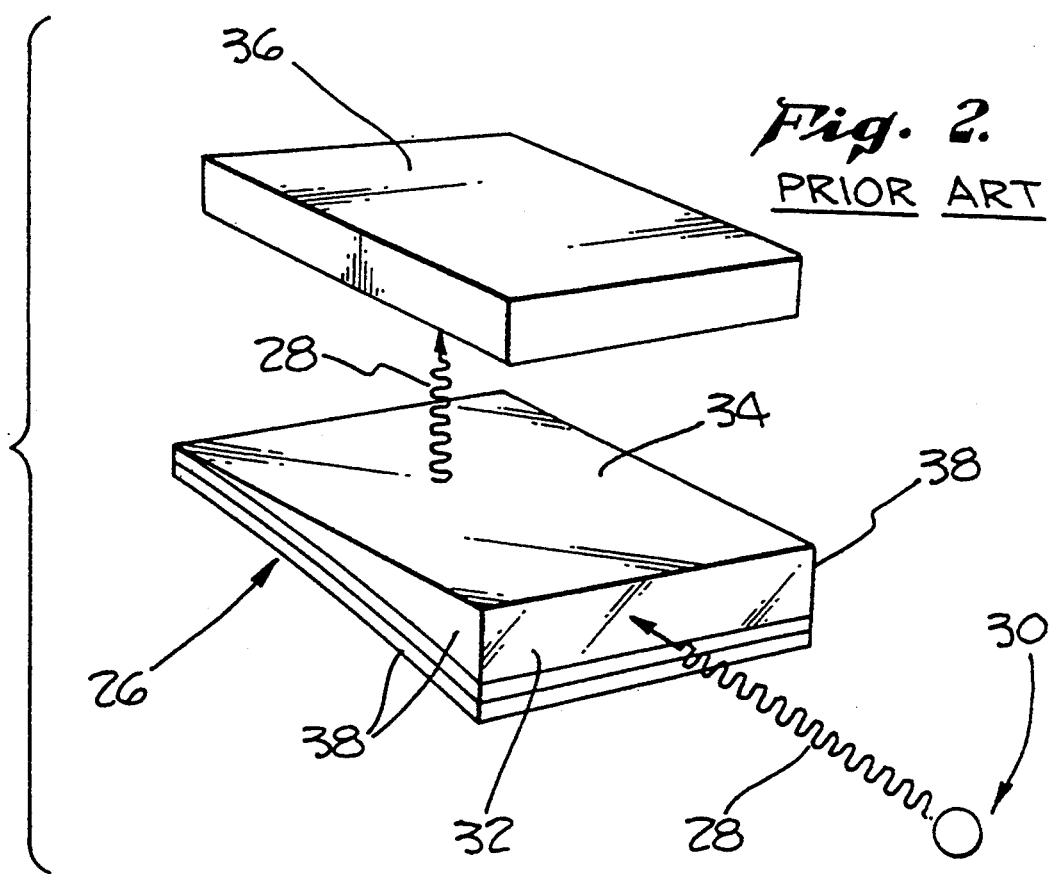
FIG. 2 is a prior art wedge-shaped edgelit block.

A prior art example of an edge lighting technique is a wedge-shaped edge-lit block 26, as described in Hehr, U.S. Pat. No. 4,277,817, and is shown in FIG. 2. The block 26 is usually made of glass or plastic. Incident light 28 from lamp 30 enters the wedge-shaped block 26 through the edge surface 32 of the block 26. Total internal reflection of the light 28 occurs until the critical angle is exceeded, at which point the light 28 exits the block 26 through the face 34 to illuminate an LCD 36 located above the block emission surface 34.

Shaping the edge surface 32 into a spherical, parabolic or other curvature is sometimes used to improve uniformity from the edge lighting source, particularly for large area devices, as is more fully described in Hehr, Suzawa, U.S. Pat. No. 4,618,216, and Hathaway, et al, *New Backlighting Technologies for LCD's*, 91 SID Digest, pp. 751–54.

In addition, bottom surface treatments can be used to shape the emission envelope of the wedge block 26 for higher brightness. See Suzawa. These include microgrooves, microbeads, or the inclusion of a light scattering plate. Edgelit panels are usually described as having a reflective coating 38 or material applied to all surfaces except the one in which light is intended to exit in order to improve efficiency, as described in Hehr, Suzawa, Hathaway and Shaw, U.S, Pat. No. 4,974,122.

FIG. 3 is illustrative of a display assembly panel 40 of the present invention, and shows the combination of a high brightness fluorescent backlight 42, coupled with reflective surface 44, for day viewing, and an edge-lit, wedge-shaped block 46 illuminated through the edge surface 48 of the block 46 with light from night lamp 50. The two sets of lamps 42, 50 operate under complementary conditions. For day viewing, only the high brightness, fluorescent backlighting lamps 42 are illuminated. During use at night, only the edge lighting night lamp 50 is illuminated. Obviously, the night lamp 50 can be operated in combination with the day lamps 42 without untoward effects during daylight viewing.

In the present invention as shown in FIG. 3, the edge-lit wedge-shaped block 46 also functions as a diffuser for the day lamps 42. Therefore, rather than putting a reflective surface behind the wedge-shaped block as in FIG. 2, the reflecting surface 44 is instead placed behind the fluorescent day lamps 42. This permits the transmission of light from the day lamps 42 through the under surface 54 of the wedge-shaped block 46 without being impeded by a reflective coating which might otherwise be placed on the underside 54 of the wedge-shaped block 46 as in FIG. 2.

A diffuser plate 56 is placed at the front surface 58 of the edgelit block to enable good uniformity of light transmission from the day lamps 42 and the night lamp 50 through the LCD 60. The night lamp 50 for this application could be incandescent, fluorescent, or of other lamp types, such as an aperture lamp, any of which are within the scope of this invention.

In a first embodiment, a miniature, hot cathode fluorescent lamp is used. The hot cathode structure has advantage of higher efficiency than the cold cathode fluorescent lamps typically used for the high brightness day lamps, but either may be used in this application. Alternatively, an incandescent lamp may be used. One advantage of fluorescent lamps for both day and night viewing is the broad color gamut that can be tailored by judicious selection of the phosphor components.

In another embodiment shown in FIG. 4, a display assembly 62 contains a second edge-lit, wedge-shaped block 64 placed behind the first wedge-shaped block 46'. The second wedge-shaped block 64 has a reflective coating 66 on the undersurface 68 of the second block 64 to increase the uniformity and quality of light illuminating the LCD 60'. In this configuration, both the day and night lamps 42', 50' are arranged in edge-lit fashion, allowing the display assembly 62 of FIG. 4 to be thinner than the assembly 40 in FIG. 3. The reduction in overall depth of the LCD lighting assembly 62 in FIG. 4 is due to the elimination of some of the components that are necessary for the backlighting in FIG. 3 (i.e., the backlight assembly 42).

As in the first embodiment, the day and night lamps 42', 50' operate in a complementary manner. Both are fluorescent lamps, though the day lamp 42' has a hot cathode structure for higher efficiency. However, the two blocks 46', 64 are sandwiched together to form essentially a rectangular prism.

Finally, although the backlighting assembly 62 in FIG. 4 has a first block 46' being illuminated by the night lamp 50', and a second block 64 by the day lamp 42', the reverse of this configuration would be equally effective.

Figure 5:
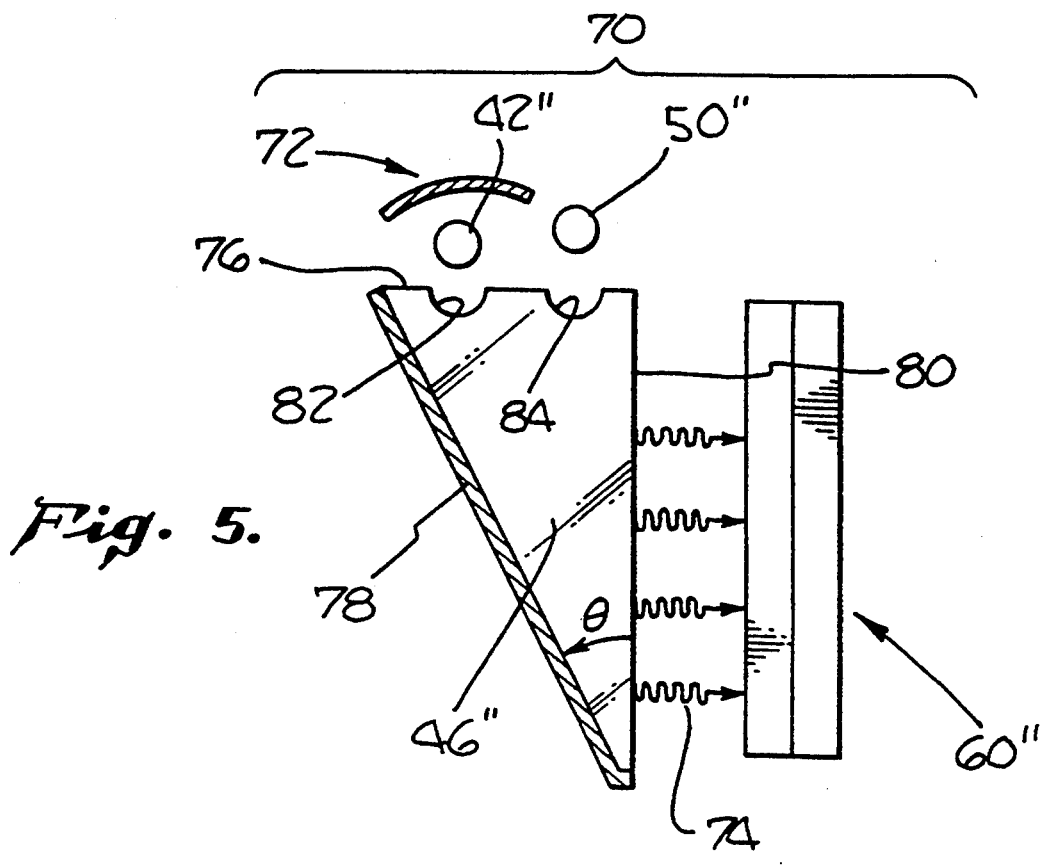
FIG. 5 is a three-dimensional top view of a generally rectangular block used to reflect light toward an LCD.

In another embodiment shown in FIG. 5, a dual edge-lit device 70 has both the day and night lamps 42", 50", respectively, in an edgelit configuration with a wedge-shaped block 46". The day and night lamps 42", 50" are adjacent to one another and a curved reflecting surface 72 is located behind the day lamp 42".

As in the embodiments shown in FIGS. 3 and 4, the lamps 42″, 50″ are operated in a complementary manner: the day lamp 42″ is operable only during daylight viewing while the night lamp 50″ is operable during nighttime viewing or day time viewing. The assembly 70 in FIG. 5, like the assembly 62 in FIG. 4, has the same advantage over the display assembly 40 in FIG. 3, in that it is thinner.

The angle ″ of the wedge-shaped block 46″ in this configuration must be chosen to accommodate the locations of the day and night lamps 42″, 50″ in order to maximize luminosity of the light 74, which first enters the block through edge surface 76 of the block 46″, is reflected by a reflective surface 78 on the underside of the block 46″, and emerges from the top surface 80 of the block 46″ to illuminate the LCD 60″.

The angle ″ is dependent upon the distance of the lamps 42″, 50″ from the edge surface 76 of the block 68, as well as the space between them. The edge surface 76 preferably contains first and second curved recesses, 82, 84 to improve the quality of light entering the wedge-shaped block 46″.

The embodiment of the invention shown in FIGS. 6 and 7 adapts the prior art structure of Tanaka, which essentially integrates two wedge-shaped blocks to form a generally rectangular block 86. The top surface 88 is formed by two planar surfaces 90 which slope downward and converge at the center 92 of the block 86. A recess 94, formed by the two downward sloping planar surfaces 90 is preferably V-shaped, although any recess 94 capable of allowing significant light to emit from the top surface 88 is within the scope of the present invention.

Beneath the planar under surface 96 of the block 86 is a reflection plate 98. Adjacent to both ends 100 of the block 86 are light sources 102, which include both day viewing lamps and night viewing lamps. Behind the lamps 102 are curved reflection plates 104, which ensure efficient illumination of the block 86. Located above the top surface 88 is a diffuser filter 106 to ensure uniform illumination of an LCD 60‴. It is also possible to simply coat the planar surfaces 90 of block 86 with diffusion material, thus eliminating the need for a diffusion filter.

Figure 8:
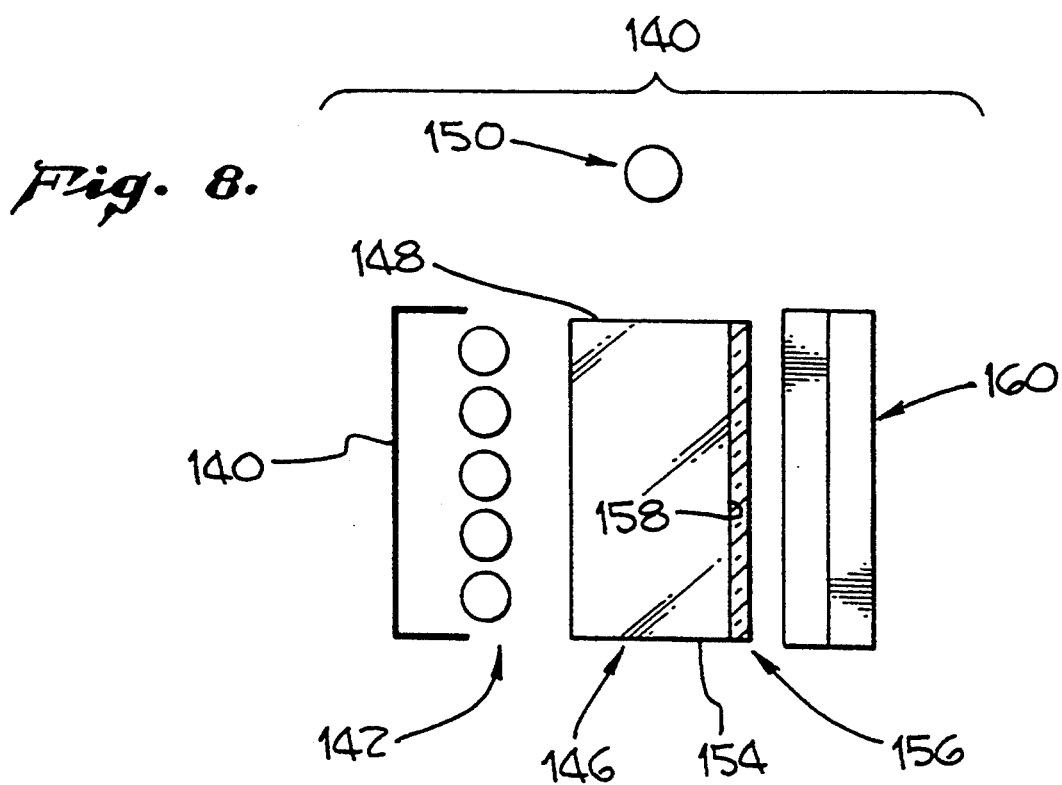
FIG. 8 is an exploded side view of a generalized LCD backlight device according to the present invention, which uses a back light for day viewing and is edgelit for night viewing.

FIG. 8 is illustrative of a more generalized display assembly block 140 of the present invention, and shows, in the broadest scope, the combination of a high brightness fluorescent backlight 142, coupled with reflective surface 144, for day viewing, and an edge-lit, translucent or transparent block 146 illuminated through the edge surface 148 of the block 146 with light from night lamp 150. External drive circuitry permits independent adjustment of the luminance of lamps 142 and lamp 150.

The two sets of lamps 142, 150 operate under complementary conditions. For day viewing, the high brightness, fluorescent backlighting lamps 142 are illuminated. During night use, only the edge lighting night lamp 150 is illuminated. Obviously, though, the night lamp 150 can be operated in combination with the day lamps 142 without untoward effects during daylight viewing because of its low luminance compared to lamps 142.

In the generalized embodiment of the invention as shown in FIG. 8, a translucent edgelit block 146 can function as a diffuser for the day lamps 142. Therefore, rather than putting a reflective surface behind the block as in FIG. 2, a reflecting surface 144 is instead placed behind the fluorescent day lamps 142. This permits the transmission of light from the day lamps 142 through the under surface 154 of the block 146 without being impeded by a reflective coating which might otherwise be placed on the underside 154 of the block 146 as in FIG. 2. A diffuser plate 156 is placed at the front surface 158 of the edgelit block to enable good uniformity of light transmission from the day lamps 142 and the night lamp 150 through an LCD 160.

The night lamp 150 for this application could be incandescent, fluorescent, or of other lamp types, any of which are within the scope of this invention. As in the preferred embodiment, a miniature, cold cathode fluorescent lamp is used. A reflector housing could be used for the night lamp similar to that used for the day lamps or an aperture lamp could be utilized.

As can be seen, the particular shape of the block 146 is not important. What is significant is the provision of both the broad day illumination which directly illuminates the LCD for day viewing and the night vision illumination which is provided at the edge of the block. While both sources of illumination could be enabled for day time viewing, only the night lamps would be used at night to preserve dark adaptation.

Other variations and modifications will occur to those skilled in the art. Accordingly, the present invention should be limited only by the scope of the claims appended hereto.

What I claim is:

1. An LCD lighting system comprising:
   a wedge-shaped block of light transmitting material, having a substantially planar display surface and a substantially planar under surface, said surfaces converging at an acute optimum angle, and an end surface opposite the converging end;
   a first light source, capable of emitting full spectrum visible light, said first light source being adjacent to one of said surfaces surface such that light from said first light source enters said block through said one of said surfaces;
   a second light source positioned to be adjacent to said end surface such that light from said second light source enters said block through said end surface; and
   means for disabling said first light source during night viewing, whereby light from said first and second sources is emitted from said planar surface display surface.

2. The LCD lighting system according to claim 1, further including means for independently adjusting luminance of said first and second light sources.

3. The LCD lighting system according to claim 1, wherein said first light source is positioned adjacent said under surface, said system further including reflection means located behind said first light source for maximizing the amount of light from said first and second light sources that emits from said planar display surface.

4. The LCD lighting system according to claim 1 wherein two remaining sides of said wedge-shaped block have reflection means adapted to maximize the amount of light from said first and second light sources that exits from said planar display surface.

5. The LCD lighting system according to claim 1 further including means for disabling said second light source during daytime viewing.

6. The LCD lighting system according to claim 1 wherein said first light source is adjacent said end surface.

7. The LCD lighting system according to claim 6, further including reflecting means located behind said first light source for maximizing the amount of light from said first light source being applied to said end surface.

8. The LCD lighting system according to claim 6, further including reflective means coating said under surface for maximizing the amount of light from said first and second light sources being emitted from said display surface.

9. The LCD lighting system according to claim 1 further including a second wedge-shaped block, said wedge-shaped blocks being positioned together to form a generally rectangular block having end surfaces and a planar display surface through which light from said light sources is able to pass, said one of said surfaces adjacent said first light source being an end surface, whereby said first and second light sources apply light to opposite end surfaces of said rectangular block.

10. The LCD lighting system according to claim 9, further including reflective means coating the planar underside surface of said block opposite said planar display surface of said second wedge block to maximize the amount of light emitted from said display surface.

11. An LCD lighting system comprising:
a wedge-shaped block of a transparent material, said block having a planar display surface and a planar under surface which converge at an acute optimum angle, said angle chosen to optimize the amount and quality of light emitting from said planar display surface, said block having an end surface opposite said acute angle;
a first light source capable of emitting a full spectrum of visible light, said first light source being adjacent to said end surface such that light from said first light source enters said block through said end surface;
a second light source also being adjacent to said end surface, such that light from said second light source enters said block through said end surface;
means for disabling said first light source during night viewing; and
means between said wedge-shaped block and an LCD for diffusing light emitted from said wedge-shaped block before reaching the LCD display.

12. The LCD lighting system according to claim 11 wherein said planar underside and two remaining sides of said wedge-shaped block include reflective means adapted to maximize the amount of light emitted from said planar display surface.

13. The LCD lighting system according to claim 11 further having means for disabling said second light source during daytime viewing.

14. An LCD lighting system according to claim 11 wherein said wedge-shaped block is truncated on a side of said acute angle, and said first and second light sources are positioned adjacent the end opposite the truncation.

15. An LCD lighting system including an LCD element, comprising:
a generally rectangular block consisting of a light transmitting material, said block having
a top display surface having a recess which increases in depth toward the center of said block;
two end surfaces opposite each other and adjacent to an end of said top display surface wherein said recess is at a minimum;
first light source means capable of emitting a full spectrum of visible light, said first light sources being adjacent one of said surfaces such that light from said first light source means enters said block through one of said surfaces and is emitted through said display surface;
second light source means adjacent at least one of said end surfaces such that light from said second light sources enters said block through an end surface and is emitted through said display surface;
means for disabling said first light source means during night viewing; and
light diffusing means between said rectangular block and the LCD for diffusing light emitting from said block before reaching the LCD display.

16. The LCD lighting system according to claim 15 wherein said recess is V-shaped and formed by two equivalent planar surfaces of said top display surface, said planar surfaces sloping downward and converging in the center of the block, the highest point of said top display surface being the convergence of each of said planar surfaces with its corresponding end surface, and the lowest point being the convergence of said planar surfaces in the center of said block.

17. The LCD lighting system according to claim 15 wherein said first light source is adjacent one of said end surfaces and a bottom surface, as well as two remaining sides of said generally rectangular-shaped block, have reflective means and are spatially adapted to maximize the amount of light emitting from said top planar display surface.

18. An LCD lighting system comprising:
a block of light transmitting material, having a substantially planar display surface, a substantially planar under and an end surface;
a first light source, capable of emitting full spectrum visible light, said first light source being adjacent to said under surface such that light from said first light source enters said block through said under surface;
a second light source adjacent said end surface such that light from said second light source enters said block through said end surface; and
means for disabling said first light source during night viewing, whereby light from said first and second sources is emitted from said planar display surface.

19. The LCD lighting system according to claim 18 further including means for diffusing light emitted from said display surface before reaching an LCD display.

20. The LCD lighting system according to claim 18, further including reflective means coating said under surface of said block to maximize the amount of light emitted from said display surface.

21. The LCD lighting system according to claim 18, further including reflective means behind said first light source to maximize the amount of light emitted from said display surface.

22. The LCD lighting system according to claim 18, further including means for independently adjusting the luminance of said first and second light sources.

* * * * *